INVENTORS
Carl P. Mies, Jr.
Aloysius C. Kracklauer

Aug. 28, 1956     C. P. MIES, JR., ET AL     2,760,641
FILTERING APPARATUS
Filed Sept. 25, 1951     3 Sheets-Sheet 2
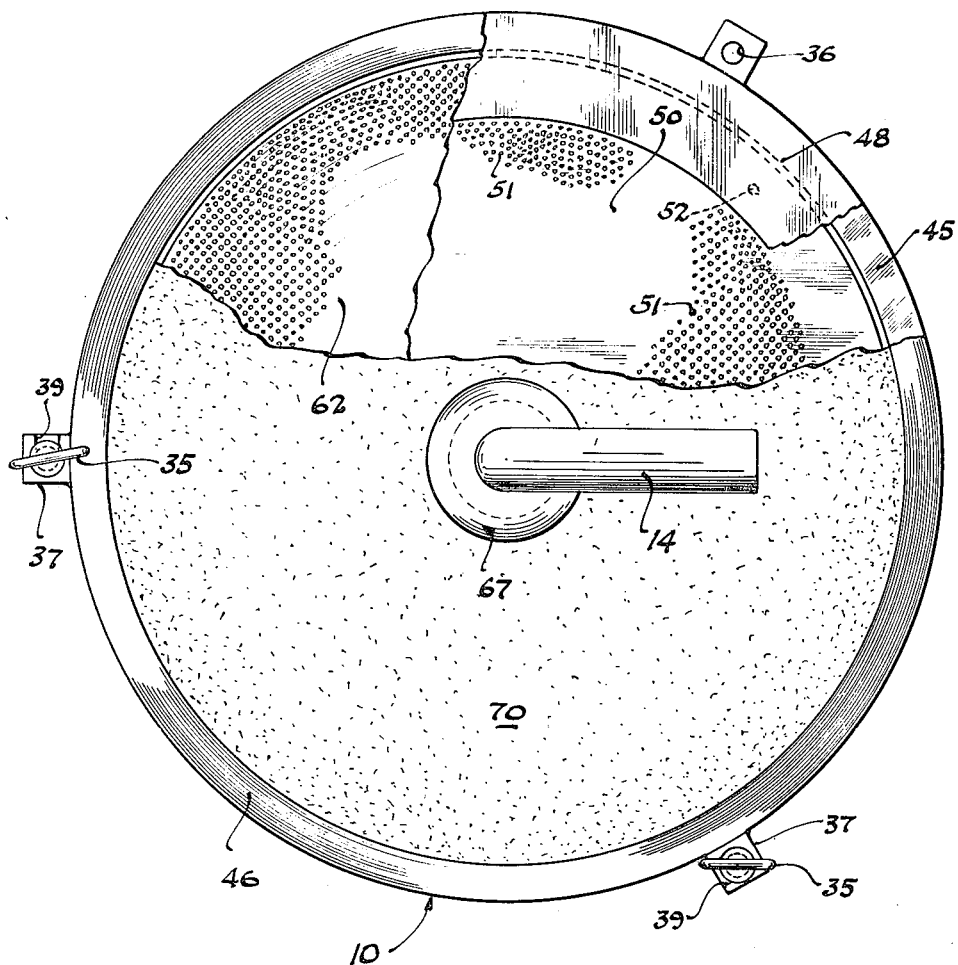
INVENTORS
Carl P. Mies, Jr.
Aloysius C. Kracklauer

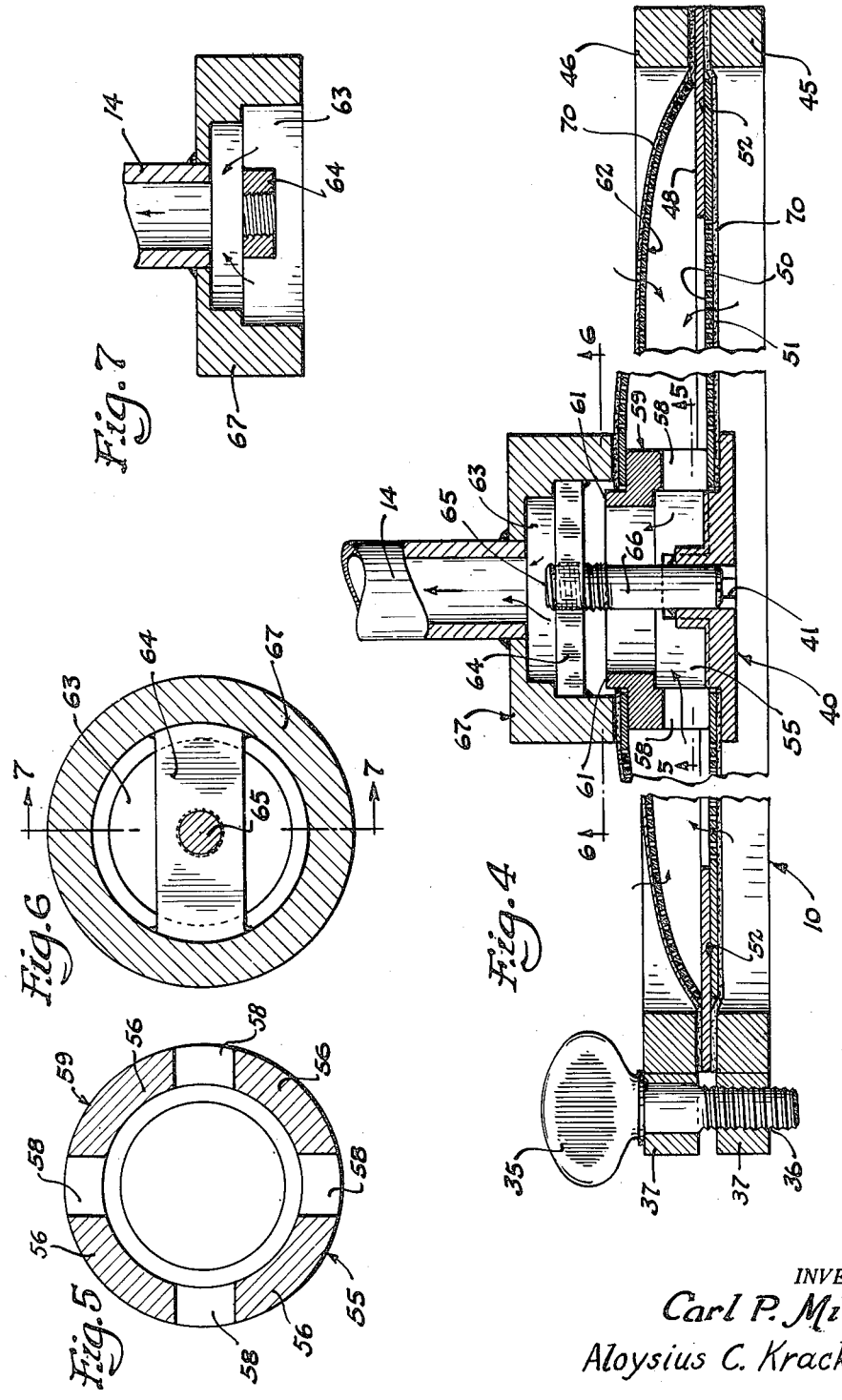

United States Patent Office 2,760,641
Patented Aug. 28, 1956

2,760,641

FILTERING APPARATUS

Carl P. Mies, Jr., Wauconda, and Aloysius C. Kracklauer, Mundelein, Ill.

Application September 25, 1951, Serial No. 248,234

11 Claims. (Cl. 210—94)

This invention relates to filters. More particularly, the invention is concerned with a portable filtering apparatus, the filtering element of which may be submerged in the body of liquid to be filtered.

In commercial, domestic, and institutional operations it is often desirable to clarify or filter bodies of liquids, such as beverages, cooking oils, water, etc. Commercial filters are usually rather large and often stationary and it is customary to conduct the material to be filtered to the filter rather than transporting the filter to the liquid. Also, heretofore, mechanical filters have been too large to operate on small batches of liquids. It has been necessary, therefore, to filter or clarify such liquids by straining through metal strainers, filter papers, cloths, etc. Such handling of liquids is disadvantageous because of the danger of contamination of the liquids, because the liquids are often at temperatures which are not suitable for handling through strainers, and because the straining operation is time-consuming.

The present invention is designed to overcome the above-noted limitations that are attendant upon the use of present day stationary commercial filters, especially when employed in the purification of edible oils which must be filtered at relatively high temperatures. Toward this end the invention contemplates the provision of a simple portable filtering apparatus which may be readily transported to a particular scene of operations, set up for use and, after purification operations have been performed upon the body of liquid at the scene of operations, and the apparatus carried to another location for further use.

Briefly, the invention includes a portable draw-off container and an associated filtering mechanism in the form of a motor and pump assembly mounted upon a suitable frame adapted to be positioned on the floor or other supporting surface adjacent the cooking reservoir of a commercial installation, such as a deep fat fryer or the like. A filter leaf assembly of novel form is operatively connected through a flexible conduit to the pump inlet and a discharge tube is similarly connected through a flexible conduit to the pump outlet. The draw-off container is placed in position beneath the usual drain cock of the cooking reservoir and, upon opening of the drain cock, the hot contents of the cooking reservoir is transferred, in part, or in its entirety, to the container. The filter leaf assembly is then submerged in the body of drawn-off liquid in the container and the motor set into operation. In this manner, liquid is drawn through the filter leaf construction and the filtrate passes through the pump and flexible conduit leading to the discharge tube. The tube is conveniently curved to provide a hook by means of which it may be "hooked" over and supported from the rim of the cooking reservoir so that the purified edible oil is gradually returned to the reservoir from the draw-off container.

The provision of an apparatus of the character briefly outlined above being one of the principal objects of the invention, another object of the invention is to provide a simple and efficient vacuum filter having a filtering element which may be submerged in the body of the liquid to be filtered.

A further object of the invention is to provide a mechanical filter which has a large filtering surface in relation to the size and weight of the filtering element.

Also, an object of the invention is to provide a new and improved filter leaf which may be used under vacuum or under pressure and which contains filtering surfaces which are readily accessible to clean the filter surface or to slough off the filter cake.

Also, an object of the invention is to provide a portable filter leaf which may be readily disassembled for cleaning or repair.

Other objects of the invention will be apparent from the description of the invention set forth below.

In the drawings:

Fig. 3 is a detailed top view, partly in section, of the filtering element;

Fig. 4 is a cross-section through the center of the filtering element;

Fig. 5 is a sectional view taken along the line 5—5 of Fig. 4;

Fig. 6 is a sectional view taken along the line 6—6 of Fig. 4; and

Fig. 7 is a sectional view taken along the line 7—7 of Fig. 6.

Figures 1, 2:
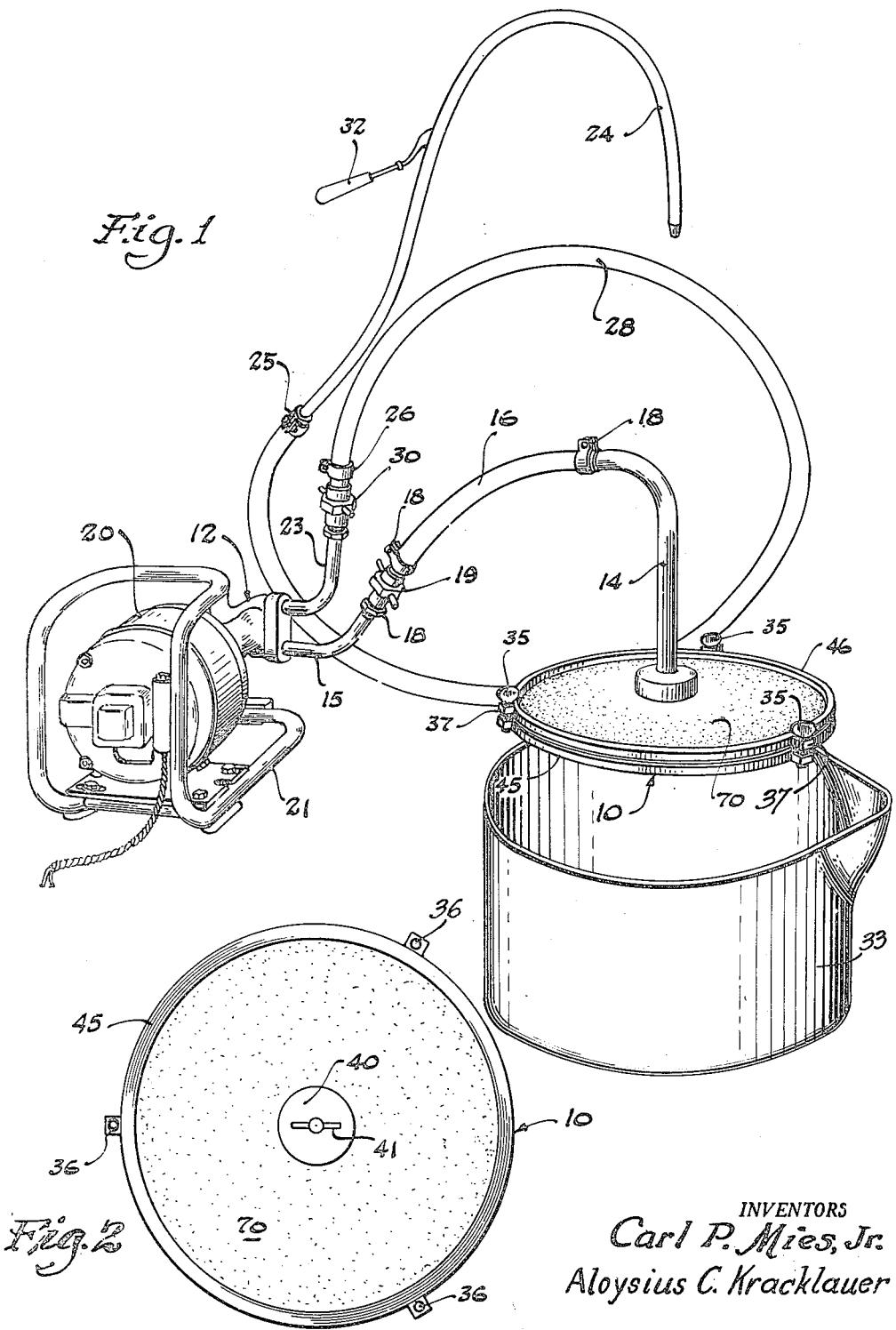
Fig. 1 is a perspective view, somewhat schematic in its representation, showing the improved filtering apparatus of the present invention set up for use.
Fig. 2 is a bottom view of the filtering element shown in Fig. 1.

In accordance with the present invention a filter plate having two filtering surfaces, which may be conical or flat in shape, is connected to an outlet tube for conducting the filtered liquid to a container. The filter plate may be operated under pressure or under vacuum. The plate is preferably operated under vacuum, in which case the outlet tube is connected to a vacuum pump for applying positive suction to the interior of the filter plate. The filter plate preferably is provided with relatively flat screens on the outer surface of which are sealed filter papers. The screens are separated by rings of smaller diameter and of about equal thickness to the screens to prevent the collapsing of the screens under vacuum or pressure. The lower screen may be welded to a flat ring of slightly larger diameter than the screen. The periphery of the screens is held together by two rings which may be clamped together. The outer surfaces of the screens are covered with a filter medium, such as a filter cloth or filter paper, etc., the edges of which are fitted between the clamping rings.

Referring to Fig. 1 of the drawings, the filter leaf is represented generally by the numeral 10. The filter leaf is connected by a delivery tube to a suction pump 12 which may be of any conventional or preferred design. The delivery tube as shown contains rigid portions 14 and 15 which are connected by a flexible portion 16. The various portions of the tube may be connected by clamps 18 and a coupling 19. The suction pump is driven by a motor 20, the size of which may vary depending upon the capacity of the filter plate and the materials to be filtered. The motor 20 is supported on a frame 21 whereby the motor may be readily transported from one place to another as by hand. The pump 12 is connected on the outlet side to a discharge tube containing a rigid connecting portion 23 and a rigid discharge terminal portion 24. The two rigid members are connected by clamps 25 and 26 to a flexible member 28. A coupling 30 is provided for disconnecting members 28 and 23. The discharge member 24 may be of relatively rigid material, such as metal or plastic material. The latter tube may be conveniently equipped with a handle 32 for manipulating the discharge tube, as for instance for inserting the curved portion of the tube over the edge of a container, such as the rim of the cooling reservoir of a deep fat fryer or the like (not shown).

It is to be understood that the unit shown in Fig. 1 may be of any desired size. It is preferably of such a size and weight that it can be conveniently transported by hand. The filter leaf 10 also can vary in size. As shown, it is adapted to be inserted in a suitable container 33 which may be a draw-off container of a capacity capable of receiving the working contents of the cooking reservoir undergoing servicing where it may become submerged in the liquid to be filtered. It is contemplated that the unit, including the filter leaf, may be of suitable sizes for inserting in draw-off or other containers of 5, 10, or even up to 50 gallons or more. The filtered liquid may be discharged from the end of the member 24 into another suitable container.

In the event it is desired to operate the filter leaf under pressure instead of under vacuum, the motor and the suction pump may be omitted and the flexible portion 16 and 28 of the discharge tube connected. The filter leaf in such case would be inserted in a pressure container wherein pressure would be exerted on the liquid to force it through the filtering surfaces and out through the discharge tubes.

The filter leaf, as indicated heretofore, contains two rings for holding the filtering surfaces together. These rings are clamped together by wing screws 35. The wing screws pass through threaded holes in the lower plate as indicated at 36 in Fig. 2. The wing screws fit through tabs 37 connected to the upper plate and, as indicated in Fig. 3, these tabs are notched at 39 whereby the upper plate may be loosened merely by partially unscrewing the wing screws and sliding the connecting bolts out through the notched portions.

As shown in Fig. 2, the bottom of the filter leaf is provided with a screw 40 which will be more fully described hereinafter. The head of the screw 40 has a recessed portion 41 into which a screw-driver may be inserted for the purpose of loosening or tightening the screw 40.

The filter leaf is shown in more detail in Figs. 3 and 4. As shown in these figures, the bottom sealing ring 45 is clamped to the top clamping ring 46 by the wing screws 35. A wide, relatively thin, sealing circular member or ring 48 is clamped between the rings 45 and 46. A lower plate screen 50 having perforations at 51 is attached, for example by spot welding as at 52, at the outer edge to the ring 48. The inner edge of the screen 50 is rigidly clamped in the recess between the flange on the head of the screw coupling 40 and the outer edge of a spider ring arrangement 55, which is the lower part of inside centering ring 59. As shown in Fig. 5, the spider ring contains solid members 56 extending from the center of the ring, leaving recesses 58 for the passage of liquid therethrough. The upper periphery of the ring 59 contains lips 61 on which rest the inner edges of the upper perforated plate or screen 62. The latter plate may be conical, semi-conical, or slightly concave in shape and the outer edge fits snugly against the ring 46 as pressure is exerted on the top thereof.

The outlet tube or conduit 14 is rigidly secured to a compression cap 67 and communicates with the hollow interior 63 of said cap. Extending across said hollow interior is a bar 64 containing a threaded hole in which the outer end 65 of the stem 66 of the screw coupling 40 is threaded. The lower portion of the compression cap fits against the lips 61 of the inside centering ring 59 whereby the screen or other filter element 62 is clamped between the center ring 59 and the compression cap 67. It would readily be observed that by turning the screw coupling 40, the compression cap can be loosened or tightened.

The upper concave filtering element 62 is flexed so that the inner edge fits on the lips 61 of the inside centering ring 59 and the outer edge of said filtering element fits inside the top clamping ring 46. As the screw coupling 40 is turned clockwise (as viewed in Figs. 2 and 4), it tightens the compression cap and the filtering element 62 is squeezed down against the inside of the upper clamping ring 46.

The filtering elements 50 and 62 are preferably covered with a filter aid material, such as paper, cloth, filter cell, etc. As shown in the drawing, the surfaces are covered with sheets 70, such as filter paper, and the outer periphery of which is clamped between the upper and lower clamping rings 45 and 46 forming a tight seal.

In assembling the filtering unit the lower filtering element 50 is covered on the underside with filter paper and the filtering element and paper laid on the lower clamping ring 45. The upper filtering element 62 is then covered with a filter paper 70 and the filter element and paper laid on the outer ring portion 48 of the lower filtering element, the paper extending under the upper clamping ring 46. The wing screws 35 may then be tightened, clamping the rings 45 and 46. The stem 66 of the threaded screw coupling 40 is inserted inside the hole of the lower filtering element 50 and the spider 55 of ring 59 placed thereover. The compression cap 67 is then placed over the ring 59 with the rim thereof resting on ring 59 adjacent lips 61. The screw coupling 40 is then screwed into the threaded hole of the bar 64 of the compression cap 67. The outlet tube 14 is then connected with a flexible tube 16 which, in turn, is connected with the inlet pipe 15 of the suction pump 12. The flexible discharge tube 28 and terminal discharge member 24 are then connected to the outlet of the pump.

In using the filtering element as herein described, the filter leaf 10 is inserted in the container 33 in which the liquid to be filtered is held. The electric motor is then started whereby the liquid is sucked through the filtering surfaces and the filtered liquid pumped through the conduits and discharged into a clean container. It will be noted that the screw-threaded ends of wing screws 35 extend below the lower ring 45 to provide the depending feet which rest on the bottom of container 33. The filter unit is thus maintained in a position of elevation relative to the bottom of said container so that liquid may freely flow under the unit.

In the event the filtering surfaces become coated or plugged with material filtered out of the liquid, the filtering element may be readily lifted out of the container and the filter cake sloughed off or the filtering surfaces otherwise cleaned.

The filter of the present invention is particularly suitable for filtering edible oils used in deep fat frying, such as potato chip frying operations, doughnut making, French frying of vegetables, sea food, etc.

When put to such use, the entire apparatus, including the container 33, is brought to the scene of operations and placed upon the floor beneath the usual drain cock of the fryer and the contents of the cooking reservoir is transferred through the drain cock to the container 33. The filter leaf 10 is submerged in the drawn-off liquid in the container while the discharge tube 24 may conveniently be hooked over the edge of the cooking reservoir so that upon operation of the pump 12, the purified filtrate will be returned to the reservoir preparatory to the commencement of further cooking operations.

The filtering unit may also be used for filtering beverages, such as wines, beer, etc. It is also applicable for the filtering of other liquids, for example, water containing suspended solids.

Obviously, many modifications and variations of the invention as hereinbefore set forth may be made without departing from the spirit and scope thereof, and therefore only such limitation should be imposed as are indicated in the appended claims.

We claim:

1. A filter device for use with disposable filter elements, said device including a pair of relatively large annular clamping rings, rigid circular screens spaced apart and adapted to be supported at their peripheries by said annular rings, aligned central openings in said screens, spacing means between said screens adjacent to said aligned openings, said spacing means having a first opening communicating with said aligned central openings and a second opening connecting said first opening with the space between said screens, and compression means for clamping the central portions of the screens against said spacing means with a disposable filter element clamped between each of said screens and the contiguous portion of said compression means, said annular clamping rings being separable, and having means for clamping them together with the peripheral portions of said disposable elements clamped therebetween, said compression means including a top compression cap, said cap having a central aperture communicating with said first opening and having integral threaded means, and a bottom compression plate, said plate including integral threaded means, one of said integral threaded means including a tension member disposed within said bore and adapted to releasably engage the other of said integral threaded means.

2. In a filter device of the class described, a filter comprising a pair of relatively large coaxial annular rings, a pair of coaxial circular screens having central apertures, said screens being arranged coaxially with said rings and having an outer diameter smaller than the inner diameter of said annular rings, an annular member arranged coaxially with and disposed between said screens, said annular member being attached to one of said screens and being sufficiently large to project between said rings, removable filter elements supported by the outer side of each of said screens, clamping means for said rings whereby the outer edge of said filter elements and said annular member may be secured between said rings, spacing means disposed between the central portions of said screens, said spacing means having an axial bore communicating with said apertures and also having a passageway connecting said bore with the space between said screens, a compression cap for holding the central portion of one of said screens against said spacing means, said cap having a central aperture communicating with said bore and integral threaded means, a compression plate for holding the central portion of the other of said screens against said spacing means, said plate including integral threaded means, one of said integral threaded means including a tension member disposed within said bore and adapted to releasably engage the other of said integral threaded means to apply sealing pressure, and a conduit connected with said compression cap aperture and extending upwardly from said filter.

3. In a filter unit having a pair of centrally-apertured, superposed foraminous discs covered on each outer face by a filter sheet and held in sealing engagement at their outer margins by peripheral clamping means, a nesting core comprising: an upper cap member, a middle spacer member providing ingress to the core from the space between the foraminous discs, and a lower base member, each successive member upward nesting in the recess portion of the next lower member, said recesses each defining a horizontal and vertical abutment for the inner marginal portions of said discs, said members of the core sealing said inner marginal portions by means axially compressing the nesting core, and a connection from the core to a vacuum pump.

4. A filter unit is specified in claim 3, in which the middle spacer member has a plurality of channels cut into its lower face to provide unimpeded communication to the core.

5. A filter unit as specified in claim 3, in which said compressing means includes a socket member attached to the inside of the cap member, and a bolt extending through the lower base member to engage with the socket; and in which said connection opens from the upper cap member axially of the core.

6. A filter unit for submergence in a liquid-containing receptacle comprising two superposed foraminous discs each formed with a central aperture, the lower disc being flat and the upper disc being inclined upwardly toward its central aperture, a centrally apertured filter sheet overlying and underlying each upper and lower disc, respectively, and in substantially continuous contact therewith, a sealing ring between the two discs adjacent their outer margins, a base plate underlying the lower filter sheet adjacent the central aperture thereof to afford a sustaining support therefor and for the disc associated therewith and provided with a low platform receivable within the central aperture thereof and with a margin therefor engaging the inner margins of the lower disc and associated filter sheet, and provided further with an upstanding hub having an axial opening therethrough, a chambered spacer having a circular wall extending between the two discs for engagement at its top with the lower face of the upper disc and at its bottom with the top face of the lower disc, both adjacent the central apertures thereof, and formed with an upstanding collar in engagement with the inner margins of the upper disc and its associated filter sheet, the marginal wall of the spacer being formed with a plurality of radial ports open at the bottom to expose therethrough the top face of the lower disc thereby to provide unimpeded communication inwardly through such ports, a chambered cap overlying the spacer having an apertured head and a marginal wall depending therefrom for engagement with the upper filter sheet adjacent its central aperture, a discharge conduit affixed to the cap head in communication with the interior thereof and extending upwardly therefrom to a source of minus pressure, a socket member provided interiorly of the cap fixedly spaced from its head and provided with a tapped hole axially of the cap, a stud bolt extended upwardly through the base plate hub and into the tapped hole of the socket member threaded engagement therewith and arranged, when rotatively advanced therein, to draw the base plate and cap toward each other thereby to compress therebetween the two discs and filter sheets associated therewith, upper and lower compression rings engaging between them the upper and lower filter sheets at points adjacent the outer margins of their supporting discs and having means for pressing one ring toward the other and upon the sealing ring therebetween with a variable pressure, and means depending from the lower compression ring resting upon the receptacle bottom thereby to support the filter unit in elevated position relative thereto and providing therebelow a space wherein liquid may freely circulate to be drawn therefrom through the lower filter sheet into the interior of the filter unit.

7. A filter unit for submergence in a liquid-containing receptacle comprising two superposed foraminous discs each formed with a central aperture, the lower disc being flat and the upper disc being inclined upwardly toward its central aperture, a centrally apertured filter sheet overlying and underlying each upper and lower disc, respectively, and in substantially continuous contact therewith, a sealing ring between the two discs adjacent their outer margins, sectional means providing a closed central chamber axially between the two discs adjacent their inner margins comprising a base plate underlying the inner marginal portion of the lower filter sheet, a spacer having a circular wall positioned between the two discs and engaging the inner marginal portions thereof to space them apart at that point, and a cap having a circular wall overlying the inner marginal portion of the upper sheet, a conduit in connection with the cap and in communication with the chamber inwardly thereof and extending away therefrom to a source of minus pressure, means for axially compressing the cap, spacer and base together with the portions of the filter sheets therebetween, the circular wall of the spacer being formed therethrough with a plurality of radial ports establishing communication between the chamber therewithin and the space outwardly thereof lying between the foraminous discs, each port extending down to the level of the upper face of the lower disc to avoid impedance to movement of liquid therethrough, a pair of upper and lower compression rings arranged adjacent the outer margins of the foraminous discs, one in engagement with each filter sheet, means for pressing the two rings toward each other thereby to compress the filter sheets and sealing ring therebetween to prevent fluid leakage at these points, and means depending from the lower ring for engagement with the bottom of the receptacle to support the filter unit a fixed distance thereabove.

8. A filter unit for submergence in a liquid-containing receptacle comprising two superposed foraminous discs each formed with a central aperture, a centrally apertured filter sheet overlying and underlying each upper and lower disc, respectively, and in substantially continuous contact therewith, a sealing ring between the two discs adjacent their outer margins, and acting to space them apart at that point, sectional means providing a closed central chamber axially between the two discs adjacent their inner margins comprising a base plate underlying the inner marginal portion of the lower filter sheet, a spacer having a circular wall positioned between the two discs and engaging the inner marginal portions thereof to space them apart at that point, and a cap having a circular wall overlying the inner marginal portion of the upper sheet, a conduit in connection with the cap and in communication with the chamber inwardly thereof and extending away therefrom to a source of minus pressure, means for axially compressing the cap, spacer and base together with the portions of the filter sheets therebetween, the circular wall of the spacer being formed therethrough with a plurality of radial ports establishing communication between the chamber therewithin and the space outwardly thereof lying between the foraminous discs, each port extending down to the level of the upper face of the lower disc to avoid impedance to movement of liquid therethrough, a pair of upper and lower compression rings arranged adjacent the outer margins of the foraminous discs, one in engagement with each filter sheet, and means for pressing the two rings toward each other thereby to compress the filter sheets and sealing ring therebetween to prevent fluid leakage at these points.

9. A filter unit for submergence in a liquid-containing receptacle comprising two superposed foraminous discs each formed with a central aperture, a centrally apertured filter sheet overlying and underlying each upper and lower disc, respectively, and in substantially continuous contact therewith, a sealing ring between the two discs adjacent their outer margins and acting to space them apart at that point, a compression ring extending continuously around the upper filter sheet adjacent its outer margin oppositely of a second compression ring extending continuously around the lower filter sheet in engagement therewith adjacent its outer margin, means for tightening the two compression rings, one with respect to the other, thereby to compress the filter sheets, one against the other and against the sealing ring therebetween, to prevent fluid leakage at this point, means forming a sectional chamber axially of the two discs comprising a base plate underlying the lower foraminous disc and in supporting engagement with the lower filter sheet adjacent its inner margin, a spacer having a circular wall extending between the two discs adjacent their inner margins to space them apart at that point and provided with centering means in engagement with the upper disc, there being a plurality of radial ports formed through the spacer wall adjacent its bottom to establish communication between the enclosed spaces inwardly and outwardly thereof, and a cap having a depending circular wall positioned over the filter sheet and in engagement therewith adjacent its inner margin, a conduit in connection with the cap in communication with the chamber therewithin and in connection with a source of minus pressure, and means interconnecting the cap, spacer and base plate for axial compression, one upon the other and upon the filter sheets therebetween, whereby to prevent leakage at these points.

10. A filter unit for submergence in a liquid-containing receptacle comprising two superposed foraminous discs each formed with a central aperture, the lower disc being flat and the upper disc being inclined upwardly toward its central aperture, a centrally apertured filter sheet overlying and underlying each upper and lower disc, respectively, and in substantially continuous contact therewith, a sealing ring between the two discs adjacent their outer margins, a compression ring extending continuously around the upper filter sheet adjacent its outer margin oppositely of a second compression ring extending continuously around the lower filter sheet in engagement therewith adjacent its outer margin, means for tightening the two compression rings, one with respect to the other, thereby to compress the filter sheets, one against the other and against the sealing ring therebetween, to prevent fluid leakage at this point, means forming a sectional chamber axially of the two discs comprising a base plate underlying the lower foraminous disc and in supporting engagement with the lower filter sheet adjacent its inner margin, the base plate having a raised central portion receivable within the central aperture of the lower disc and a top face substantially flush therewith, a chambered spacer having a circular wall extending between the two discs adjacent their inner margins, and provided with centering means in engagement with the upper disc, there being a plurality of radial ports formed through the spacer circular wall adjacent its bottom to establish communication between the enclosed spaces inwardly and outwardly thereof, and a chambered cap having a depending circular wall positioned over the filter sheet and in engagement therewith adjacent its inner margin, a conduit in connection with the cap in communication with the chamber therewithin and in connection with a source of minus pressure, and means interconnecting the cap, spacer and base plate for axial compression one upon the other and upon the filter sheets therebetween whereby to prevent leakage at these points.

11. A filter device comprising a pair of screen plates positioned adjacent each other, a disposable filter element associated with one side of each plate, means for releasably clamping the edges of said plates and said elements together, said plates and said elements each being formed with a relatively large perforation inwardly of their respective edges, said perforations being axially aligned, a hollow spacer received between said plates and their associated filter elements and aligned with said perforations, said spacer being formed with flat surfaces along the edges of each end thereof, one end of said spacer also being formed with protruding means spaced inwardly of the said surface at said one end, said protruding means being arranged to define abutment means of a size to be received through the aligned perforations of one of said plates and its associated filter element and align said spacer with respect to said one plate and its associated filter element, said spacer forming a chamber between said plates and their associated filter elements, said clamping means sealing said chamber at its outer extremity, said spacer being formed with at least one passage extending between said chamber and the hollow interior of said spacer, said spacer being open at said one end thereof, a first cap-shaped compression member positioned over said aligned perforations of said one of said plates and its associated filter element, a second relatively flat compression member positioned over the aligned perforations of the other of said plates and its associated filter element, said first and second compression members being formed with flat surfaces along their edges adapted to be aligned with the respective flat surfaces of said spacer, said surface of said first compression member comprising the rim thereof, said second compression member being formed with protruding means spaced inwardly of said surface thereof, said protruding means being arranged to define abutment means of a size to be received through the aligned perforations of said other plate and its associated filter element and align said second compression member with respect to said other plate and its associated filter element, and means for drawing said compression members together with the said surfaces of said first and second compression members being urged toward the respective surfaces of said spacer, said last mentioned means sealingly clamping the respective plates and filter elements between the respective surfaces of said spacer and said compression members, and including a tension element extending between said compression members through said hollow interior of said spacer, said first compression member being formed with conduit means in communication with said open end of said spacer, said abutment means centering said compression members and said spacer with respect to each other.

References Cited in the file of this patent

UNITED STATES PATENTS

| | | | |
|---|---|---|---|
| 361,474 | Weygant | Apr. 19, | 1887 |
| 1,506,652 | Maker | Aug. 26, | 1924 |
| 1,530,845 | Milkey | Mar. 24, | 1925 |
| 1,561,744 | Raymond | Nov. 17, | 1925 |
| 1,568,796 | Breer | Jan. 5, | 1926 |
| 1,595,344 | Lomax | Aug. 10, | 1926 |
| 1,773,134 | Fisher | Aug. 19, | 1930 |
| 1,940,208 | Dieman | Dec. 19, | 1933 |
| 1,945,824 | Saxe | Feb. 6, | 1934 |
| 2,088,199 | Gleason | July 27, | 1937 |
| 2,328,891 | Cline | Sept. 7, | 1943 |
| 2,424,211 | Webb | July 15, | 1947 |
| 2,564,174 | Roman | Aug. 14, | 1951 |
| 2,615,574 | Kracklauer | Oct. 28, | 1952 |

FOREIGN PATENTS

| | | | |
|---|---|---|---|
| 780,398 | France | Jan. 29, | 1935 |